(12) United States Patent
Raj (10) Patent No.: US 8,928,240 B2
(45) Date of Patent: Jan. 6, 2015

(54) METHOD AND SYSTEM FOR DRIVING ORGANIC LED'S

(75) Inventor: Rashmi K. Raj, Gainesville, VA (US)

(73) Assignee: ABL IP Holding LLC, Conyers, GA (US)

( * ) Notice: Subject to any disclaimer, the term of this patent is extended or adjusted under 35 U.S.C. 154(b) by 726 days.

(21) Appl. No.: 13/210,735

(22) Filed: Aug. 16, 2011

(65) Prior Publication Data
US 2013/0043803 A1 Feb. 21, 2013

(51) Int. Cl.
H05B 37/02 (2006.01)
H05B 33/08 (2006.01)

(52) U.S. Cl.
CPC ............ *H05B 33/0896* (2013.01); *Y02B 20/36* (2013.01)
USPC .................................................... 315/241 R

(58) Field of Classification Search
CPC ........ H05B 33/08; H05B 37/02; H05B 41/34; H05B 41/32
USPC .............. 315/127, 241 R, 245, 246, 291, 307
See application file for complete search history.

(56) References Cited

U.S. PATENT DOCUMENTS

| | | | |
|---|---|---|---|
| 5,813,753 A | 9/1998 | Vriens et al. | |
| 6,007,225 A | 12/1999 | Ramer et al. | |
| 6,191,534 B1 * | 2/2001 | Schuler et al. | 315/169.3 |
| 6,323,631 B1 | 11/2001 | Juang | |
| 6,495,964 B1 | 12/2002 | Muthu et al. | |
| 6,969,843 B1 | 11/2005 | Beach et al. | |
| 7,145,125 B2 | 12/2006 | May et al. | |
| 7,148,632 B2 | 12/2006 | Berman et al. | |
| 7,604,375 B2 | 10/2009 | Rains, Jr. et al. | |
| 7,614,767 B2 | 11/2009 | Zulim et al. | |
| 7,625,098 B2 | 12/2009 | Rains, Jr. et al. | |
| 2003/0137286 A1 | 7/2003 | Kimball et al. | |
| 2004/0095098 A1 * | 5/2004 | Turner et al. | 320/167 |
| 2004/0233148 A1 * | 11/2004 | Tanghe et al. | 345/83 |
| 2006/0022615 A1 * | 2/2006 | Yang | 315/300 |
| 2008/0122376 A1 | 5/2008 | Lys | |

(Continued)

FOREIGN PATENT DOCUMENTS

WO WO-2008/090497 A2 7/2008

OTHER PUBLICATIONS

Patterson, James, "LM3409 Demonstration Board", National Semiconductor, Nov. 20, 2009, pp. 1-8, Application Note 1954, http://www.national.com/, National Semiconductor Corporation.

(Continued)

*Primary Examiner* — Minh D A
(74) *Attorney, Agent, or Firm* — RatnerPrestia (57) ABSTRACT

A method and system for driving an organic light emitting diode (OLED) with a regular LED driver without pre-charge are provided. In the examples, at least one passive element is included in parallel with the OLED across the output of the power supply. This passive element may be a capacitor. In one example, the effective series resistance (ESR) of the parallel capacitor may be substantially less than an ESR of the OLED at turn-on of the OLED. The turn-on delay of the OLED substantially is determined by the ESR of the parallel capacitor and is not substantially determined by the ESR of the OLED. In another example, the ESR of the parallel capacitor is less than or equal to 10% of an ESR of the OLED at turn-on of the OLED.

17 Claims, 5 Drawing Sheets

(56) References Cited

U.S. PATENT DOCUMENTS

| | | | |
|---|---|---|---|
| 2009/0128048 A1* | 5/2009 | Nerone | 315/226 |
| 2010/0264834 A1 | 10/2010 | Gaines et al. | |
| 2011/0109237 A1 | 5/2011 | Lyons | |

OTHER PUBLICATIONS

"SMT Aluminum Electrolytic Capacitors—General Purpose, 85 C", pp. 1-5, http://www.cde.com/, CDE Cornell Dubilier, New Bedford, MA.

Dyble, Marc, et al., "Impact of Dimming White LEDs: Chromaticity Shifts Due to Different Dimming Methods", Fifth International Conference on Solid State Lighting, Proceedings of SPIE 5941, 2005, pp. 291-299, International Society of Optical Engineers, Bellingham, WA.

"Specifications for Nichia Chip Type Warm White LED Model: NVSL219AT-H3", Nichia Corporation, pp. I, 1-16, Nichia STS-DA1-1219, Cat. No. 100930.

Johnson, Aaron R., "White-Light Generation and OLED Lifetime Issues", University of Michigan, 2008, I-XIV, pp. 1-189.

"Reference NVSW219A Capacitance", Technical Information (SE-KSE005065), Mar. 4, 2011, pp. 1, Nichia Corporation Lighting LED Development Center Technical Support Group, Nichia.

"Buck Converter Design Example", Microchip WebSeminars, 2006, pp. 1-17, Microchip Technology Incorporated.

Anonymous: "FAN5331", Fairchild semiconductor, Aug. 31, 2005, Retrieved from the internet: URL: http://www.fairchildsemi.com/ds/FA/FAN5331.pdf [retrieved on Nov. 20, 2013].

European Search Report Issued in European Application No. 12005909.2 Dated Dec. 10, 2013.

Extended European Search Report issued in European Application No. 12005909.2 dated Nov. 30, 2012.

"Low esr capacitors", All about Cirsuit Forum, Retrieved at http://forum.allaboutcircuits.com/showthread.php?t=43282, XP-002686179, Sep. 22, 2010.

T. Hergarty, "Paralleling Electrolytic and Ceramic Capacitors Perks up POL Transient Response", retreived at http://www.how2power.com/newsletters/1103/articles/H2PToday1103_design_National.pdf, Mar. 1, 2011.

"Triac Dimmable Offline LED Driver," National Semiconductor Corporation, LM3445, Oct. 9, 2009.

"PFET Buck Controller for High Power LED Drivers," National Semiconductor Corporation, LM3409/LM3409HV, LM3409Q/LM3409QHV, Apr. 12, 2010.

R. Ng, Design and Application of OLED Drivers, Solomon Systech Kimited.

M. Karlsson et al., "Analysis of a Capacitive Loaded Buck Converter".

Aluminum Electrolytic Capacitors, General technical information, EPCOS, Nov. 2008.

\* cited by examiner

METHOD AND SYSTEM FOR DRIVING ORGANIC LED'S

TECHNICAL FIELD

The present subject matter relates to Organic Light-Emitting Diodes ("OLEDs") and more particularly to methods and systems for driving the same.

BACKGROUND

A LED or "light emitting diode" is a type of diode, that is to say a type of electronic component that conducts electric current in only one direction, which is configured to emit light when it is conducting current of sufficient magnitude. Typically, a LED is a semiconductor device, that is to say, formed of two or more layers of differently doped semiconductor layers, with a junction formed at the boundary between layers. When voltage of sufficient magnitude and appropriate polarity is applied through the layers and across the junction, current flows in the forward direction of the diode and causes the LED to emit light. An OLED is an organic light emitting diode, which is a type of LED that uses a film of organic compounds that emits light in response to the electric current through the diode.

Organic light emitting diodes (OLEDs) have been increasing in popularity for a number of reasons, such as their superior performance in power efficiency, potential for lower cost of manufacture, thickness, light weight, contrast, viewing angle, and response speed. In addition, OLEDs are self-luminous and therefore do not require separate backlighting. The unique characteristics of OLEDs allow them to be made into flexible and even rollable displays. Unlike liquid crystal, field emission, or plasma displays, which require thin film processing on two glass plates, an OLED can be fabricated on a single sheet of glass or plastic. OLED technology is found in a wide range of applications, including displays for portable devices such cell phones and PDA's. Indeed, there are goals to apply this technology to computer displays and even large screen TV's. OLEDs can also be used in light sources for space illumination.

A typical OLED may include layers of organic material situated between a transparent anode and a metallic cathode. The organic layers comprise a hole-injection layer, a hole-transport layer, an emissive layer, and an electron-transport layer. When sufficient voltage is applied to the OLED, the injected positive and negative charges combine in the emissive layer to produce light. The brightness of the light is proportional to current flow. The dopant defines the visible color emitted. The semiconductor needs to have wide enough bandwidth to allow exit of the light. The most typical inorganic thin-film EL (TFEL), for example, is ZnS:Mn with its yellow-orange emission. Examples of the range of EL material include: powder zinc sulfide doped with copper or silver; thin film zinc sulfide doped with manganese, natural blue diamond (diamond with boron as a dopant), III-V semiconductors—such as InP, GaAs, and GaN, and Inorganic semiconductors—such as $[Ru(bpy)_3]^{2+}(PF_6^-)_2$, where bpy is 2,2'-bipyridine. Different materials allow OLEDs to provide colors covering the visual spectrum, thereby obviating a need for filters. The absence of filters helps improve light transmission efficiency, thereby reducing power consumption.

One way of generating white light is by wavelength conversion. In wavelength conversion, the emission from an ultraviolet or blue OLED is absorbed by one or more phosphors. The combined emission of the OLED and the phosphors provides a broad spectrum appearing white. However, the more common technique for generating white light in an OLED is through color mixing. In this regard, there are several color mixing techniques, all characterized by having multiple emitters in a single device.

Some of the most common techniques for generating white light in an OLED include multi-layer structures of red, green, and blue emitters; energy transfer blends comprising a blue donor and red/orange acceptor; bimolecular complex emitters which produce exciplex and excimer states to broaden the emission; microcavity structures which tune the final emission via deconstructive interference; multi-pixel structures which combine multiple emissive regions in to a single structure; and doping of a single emission layer with multiple emitters.

OLEDs have unique electrical properties which differentiate them from their rival Light Emitting Diodes (LEDs). The high parasitic capacitance (C) and equivalent series resistance (ESR) of an OLED can make them incompatible with typical LED driver circuitry. For example, the C of OLEDs can delay the response time. Due to the relatively large C, the OLED will remain OFF until a driver charges the OLED capacitance above the threshold voltage of the OLED diode. If a pulsating driver current is applied, the OLED may become dim and its brightness difficult to regulate. Moreover, if a LED driver is used to drive an OLED without any accommodations, the high C and ESR of the OLED may render the OLED inoperable. Indeed, the parasitic capacitance of the OLED may destabilize the closed-loop control system between the driver and the OLED.

A traditional way of accommodating the parasitic capacitance of the OLED is through pre-charge. For example, a constant current source may charge the C of the OLED linearly. However, before the threshold voltage of the OLED is reached (i.e., diode threshold), there is no current flowing through the OLED, keeping it dark. Thus, even if pre-charge circuits may aid in charging the OLED's parasitic capacitance, they can introduce significant Turn-ON delay, which is aesthetically unpleasing.

Accordingly, there is a need for a method and system for driving an OLED that does not rely on pre-charge to provide an aesthetically pleasing light output and provides a commercially acceptable short Turn-ON delay.

SUMMARY

The teachings herein alleviate one or more of the above noted problems and provide improved driving of an organic light emitting diode, by providing a capacitor connected in parallel with the OLED across the output of the power supply.

Organic LEDs include electrical properties which may make them incompatible with regular LED drivers (i.e., power sources). In this regard, high parasitic capacitance and high equivalent series resistance of the OLED introduce a high RC time constant. Indeed, the RC load represented by an OLED may be four orders of magnitude larger than that of a LED RC load. Accordingly, it may take four orders of magnitude longer to turn-ON and to turn-OFF an OLED load than it may take a LED load.

By introducing a passive component in parallel to the OLED, the RC time constant of the combined output load on the power source is substantially reduced. The passive component can be a low ESR capacitor. For example, the ESR of the parallel capacitor is substantially less than an ESR of the OLED at turn-on of the OLED. In this regard, the turn-on delay of the OLED is substantially determined by the ESR of the parallel capacitor, and not substantially determined by the ESR of the OLED. Further, the effective series resistance (ESR) of the parallel capacitor may be less than or equal to 10% of an ESR of the OLED at turn-on of the OLED. Consequently, by reducing the effective RC time constant of the combined load of the OLED in parallel with the low ESR capacitor, the turn-ON time of the OLED is reduced to where it is humanly not perceptible, resulting in a light output that is aesthetically pleasing.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples of driving OLEDs disclosed herein may be used for any OLED application, including display and lighting applications. Reference now is made in detail to the examples illustrated in the accompanying drawings and discussed below.

Figure 1A:
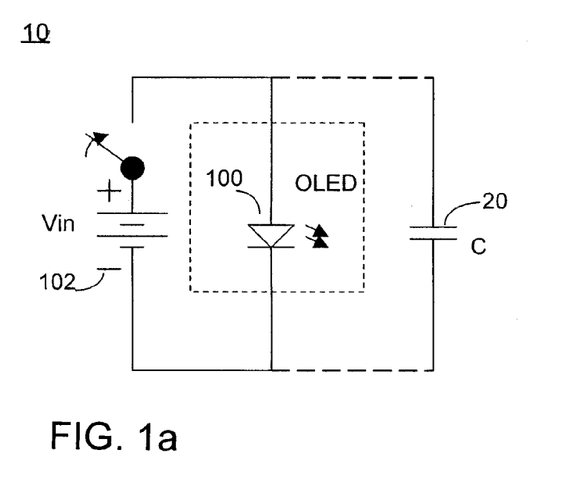
FIG. 1a is a simplified circuit diagram of a device of our system with a power supply for driving an OLED to emit light, where the OLED is connected in parallel with a low ESR capacitor.
Figure 1B:
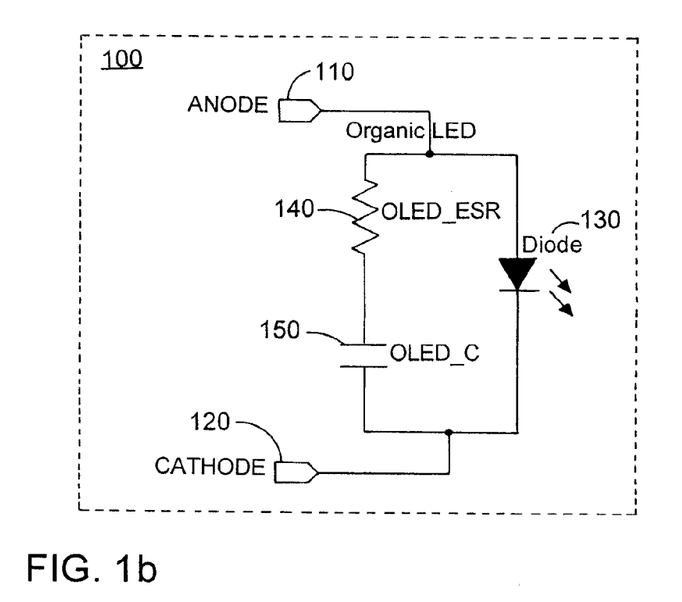
FIG. 1b is an electrical model of a typical OLED.

FIG. 1a illustrates an OLED 100 connected in parallel with a capacitor 20. FIG. 1b illustrates an electrical simulation model of a typical OLED. As shown the circuit includes a power supply 102 configured to drive the OLED 100. In this first simple example, the OLED 100 is connected across an output of the power supply 102 via an ON/OFF switch 104.

As shown by the simulation model, the OLED 100 may be considered as an ideal diode 130 connected in parallel with a series combination of an ESR 140 and a parasitic capacitance (C) 150.

In order for the diode 130 to be ON (i.e., to emit light), the voltage between the anode 110 and cathode 120 must be above the diode 130 threshold. Without the parallel capacitor (C) 20, the time constant of the OLED is determined by the OLED capacitance OLED_C 150 and the effective series resistance, OLED_ESR 140. When voltage is applied across the OLED 100, the charging current starts flowing through OLED_ESR 140 to non-linearly charge the capacitor. The turn-ON threshold voltage for the diode of the OLED cannot be reached unless the inherent parallel parasitic capacitance 150 is charged by current flowing from the power supply through the parasitic ESR 140 so that the voltage across C 150 and ESR 140 to a voltage at or over the diode threshold voltage. In contrast, an ideal capacitance (with no resistive or inductive impedance) could charge up instantly when power is supplied.

By introducing a passive component in parallel to the OLED, (the low ESR capacitor 20, in our example,) the RC time constant of the combined load on the power source is substantially reduced. For example, the ESR of the parallel capacitor is substantially less than an ESR of the OLED at turn-on of the OLED. The low ESR in the parallel path of C 20 allow the voltage on that capacitor and thus across the diode 130 to charge to the diode threshold voltage much faster. With the two capacitors in parallel, the effective ESR is now dominated by that of the lower ESR value. The turn-on delay of the OLED is substantially determined by the ESR of the parallel capacitor, and not substantially determined by the ESR of the OLED. In later examples, the effective series resistance (ESR) of the parallel capacitor may be less than or equal to 10% of an ESR of the OLED at turn-on of the OLED. Consequently, by reducing the effective RC time constant of the combined load of the OLED in parallel with the low ESR capacitor, the turn-ON time of the OLED is reduced to where it is humanly not perceptible, resulting in a light output that is aesthetically pleasing.

Figure 3:
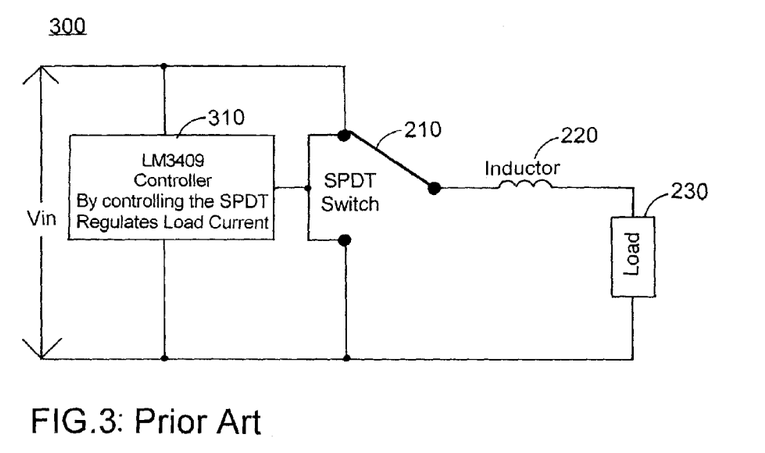
FIG. 3 is a diagram of a typical LED driver with a load.
Figure 4:
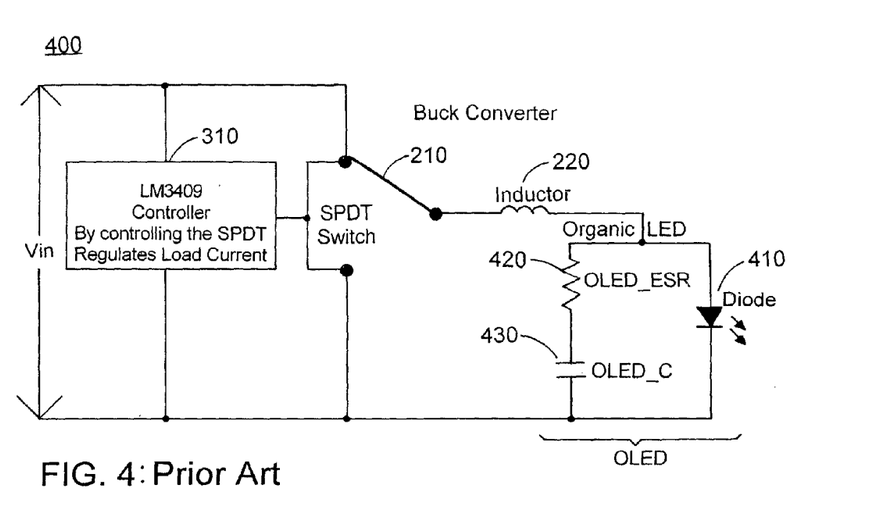
FIG. 4 is a diagram of a typical LED driver with an OLED load.

By way of example, the following discussion explains why a capacitor with low ESR in parallel with an OLED load is included to drive an OLED. FIG. 3 illustrates a simple buck converter with a regular SPDT controller 310 driving a regular LED load (i.e., non-OLED). For example, the SPDT 310 controller can be a National Semiconductor based LM3409 and the load can be a Nichia White NVSW219A (i.e., a regular LED). When the driver is turned ON, the LED lights up with no perceptible delay. Further, in the configuration of 300, the load (i.e., LED) is dimmable throughout the range from a minimum brightness (i.e., OFF) to a maximum brightness. For example, the switching duty cycle (i.e., time switch is ON vs. OFF) can be used to reduce the current flow through the LED and thereby control the dimming of the LED. This would provide analog (linear) dimming, where the current in the LED is turned up or down to increase or decrease the light intensity. In contrast, when the LED load of circuit 300 is replaced with an OLED (e.g., OSRAM Hexagonal panel), as illustrated in FIG. 4, no light output is observed. The discussion below explains this failure with a simple calculation of the RC time constant of the load.

The load of circuit 400 (representing an OLED,) comprises a diode 410 connected in parallel with a series combination of an OLED_ESR 420 and OLED_C 430. The time constant of this load is mostly affected by the OLED_ESR 420 and OLED_C 430. The calculations in Eq. 2 to Eq. 7 below demonstrate the difference between the time constant of an OLED load and a regular LED load in one example configuration.

Example OLED Calculations:

$$\tau_{OLED} = OLED\_ESR * OLED\_C \quad \text{(Eq. 2)}$$

$$\tau_{OLED} = 182K\Omega * 5.5\ \mu F \quad \text{(Eq. 3)}$$

$$\tau_{OLED} = 1\ \text{sec} \quad \text{(Eq. 4)}$$

Example LED Calculations:

$$\tau_{OLED} = LED\_ESR * LED\_C \quad \text{(Eq. 5)}$$

$$\tau_{OLED} = 2000\ m\Omega * 1.06\ nf \quad \text{(Eq. 6)}$$

$$\tau\tau_{OLED} = 2.12\text{-}9 \quad \text{(Eq. 7)}$$

The foregoing calculations demonstrate that the RC load represented by an OLED nine orders of magnitude larger than that of a LED. Accordingly, it may take nine orders of magnitude longer time to charge an OLED than it takes to charge a LED. Such a large time constant may inhibit the adequate charging of OLED_C 430. Unless OLED_C 430 is sufficiently charged, the forward voltage of the diode 410 may not be reached. Consequently, the OLED may not light up. Further, even if in one configuration the driver may eventually overcome the time constant and charge the OLED above the threshold voltage of the diode, the OLED would still remain OFF during the substantial time required to overcome this threshold, resulting in a dim light that is not well regulated. Thus, a regular LED driving system may not be able to accommodate an OLED load. That is because a regular LED driving system does not take into consideration the substantial time constant of the parasitic ESR 420 and capacitance 430 of an OLED.

Accordingly, OLEDs exhibit a time lag between when power is supplied between its anode and cathode, and when the diode 410 emits light. This behavior is characteristic of non-ideal capacitors, as discussed above. The rate of change of voltage across a capacitor is determined by its RC time constant, where R is the effective resistance of the capacitor. This time delay, sometimes referred as the Turn-ON time, is typically aesthetically displeasing. It is therefore desirable to reduce the Turn-ON time such that there is no perceptible delay between the time when a driver (or switch) is turned On and light is observed.

When voltage is applied across the OLED, the charging current starts flowing through the OLED_ESR 420 to non-linearly charge the capacitor 150. The charge on the capacitor is provided by Eq. 8 below:

$$Q = CV\left[1 - e^{-\frac{t}{RC}}\right] \quad \text{(Eq. 8)}$$

Where C is the capacitance;
V is the source voltage across the capacitor, and
R is the equivalent (or effective) series resistance.

Figure 5:
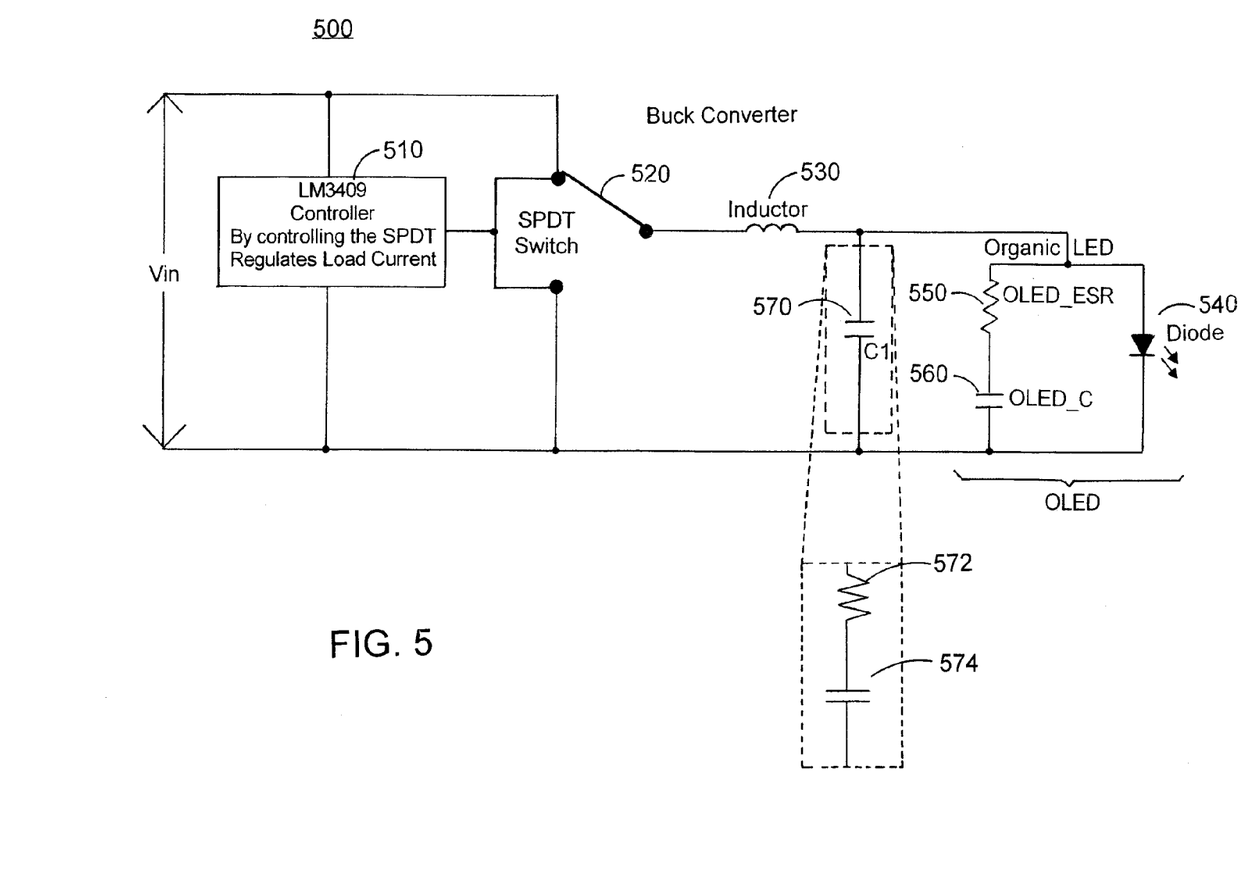
FIG. 5 is a diagram of a driver with an OLED load and a capacitor connected in parallel with the OLED across the output of the driver circuit.

FIG. 5 illustrates a configuration of a driver with an OLED load with a parallel low-ESR capacitor. By introducing an additional passive element in parallel with the OLED, the load on the driver is effectively changed. In the example, the passive element is a capacitor 570 (i.e., highlighted by a perforated box) in parallel with the OLED (i.e., components 540, 550, and 560). The added parallel capacitor 570 has a capacitance 574 and an ESR 572. The placement of an ultra-low ESR capacitor (e.g., a ceramic capacitor) in parallel with the OLED dramatically affects the dynamics of the OLED response. With the two capacitors in parallel (i.e., 570 and 560), the effective ESR is now dominated by the lower ESR value (i.e., ESR 572). In this regard, ceramic capacitors are considered to have "zero" ESR. For example a 0.1 µF ceramic capacitor may have an ESR of 10 mΩ at 100 KHz. In contrast, a general purpose 0.1 µF electrolytic capacitor (e.g. Cornell Dubilier AVS104M50A12T-F) may have an ESR of 2.322KΩ. Accordingly, a low ESR capacitor may be five orders of magnitude lower ESR than a general purpose capacitor of similar capacitance. The time constant of the parallel combination of the OLED and a ceramic capacitor 570 is provided in equations 9 to 11 below:

$$\tau_{ceramic+OLED} = Ceramic\_ESR * (OLED\_C + Ceramic\_C) \quad \text{(Eq. 9)}$$

$$\tau_{ceramic+OLED} = 10\ m\Omega * (5.5 + 0.1)\ \mu F \quad \text{(Eq. 10)}$$

$$\tau_{ceramic+OLED} = 56e\text{-}9\ \text{seconds!} \quad \text{(Eq. 11)}$$

The Turn-ON/OFF delay from such a low time constant is not perceptible to the human eye, providing an "instantaneously ON" sensation. In one example, the ESR of parallel capacitor is configured to a value such that the RC time constant of the OLED load with the parallel capacitor is less than or equal to 0.1 sec. In yet another example, the ESR of the parallel capacitor is configured to a value such that the RC time constant of the OLED load with the parallel capacitor is less than or equal to 1 µsec.

In this regard, in a bright environment (i.e., sunlight) "instantaneously ON" may be perceived in a delay in the order of 5 msec and in a dim environment in the order of 100 msec. A casual observer (e.g., a layman flipping on the lights) may perceive "instantaneously ON" with a delay of 200 to 400 msec.

Accordingly, by adding a ceramic capacitor in parallel with an OLED, the Turn-ON and Turn-Off times are substantially reduced. That is because the low ESR 572 of the parallel capacitor 570 reduces the total resistance of the load presented to the converter supplying power to the OLED.

For example, the ESR of the parallel capacitor may be substantially less than an ESR of the OLED at turn-on of the OLED and the turn-on delay of the OLED substantially determined by the ESR of the parallel capacitor, and not substantially determined by the ESR of the OLED. For example, the ESR of the parallel capacitor may be less than or equal to 10% of an ESR of the OLED at turn-on of the OLED.

As discussed before, LEDs may be dimmable. For example, this may be achieved through continuous current reduction and pulse-width-modulation (PWM) dimming schemes. Generally, PWM is preferred over continuous current reduction when dimming a light source because of its increased dimming range, greater efficiency, and more uniform chromaticity performance.

PWM dimming with respect to LEDs is a mechanism of increasing or decreasing the average light output by turning an LED ON or OFF at a certain frequency. If higher light output is desired, the LED is kept ON for a longer period of time; when lower light output is desired, the LED ON time is reduced.

Thus, by controlling the time the LED is ON versus OFF, the human perception of light dimming can be achieved. Traditional LEDs, due to their substantially lower ESR, can be turned ON and OFF rapidly. In contrast, OLEDs (due to their high parasitic capacitance and ESR) traditionally could not be dimmed using PWM. For example, the long time required to charge the OLED may cause flickering or even prevent producing light altogether.

For example, to PWM dim at 200 Hz (where the time period is 5 msec), turn-ON and turn-OFF should be less than 5 msec. For 10% duty cycle, the ON pulse is only 0.5 msec. Accordingly, the device needs to turn-ON, current needs to be steady, and then the device needs to turn-Off—all in a matter of 0.5 msec, which is not readily achievable in traditional OLED driving techniques.

OLEDs can be made compatible with PWM dimming schemes by using a low ESR capacitor 570 in parallel with the OLED (540 to 560), as illustrated in FIG. 5. Such parallel capacitor 570 substantially reduces the combined output load on the power source, thereby allowing the OLED to be switched ON and OFF without the human perception of flickering.

It will be understood by ones skilled in the art that output capacitors (e.g. parallel with the load) are sometimes used in switch mode power supplies for a variety of reasons. For example, they may be used to reduce the ripple at the output, as illustrated in FIG. 2b. Further, output capacitors may be used to reduce the magnetism of the converter or even to increase the system efficiency by reducing the switching frequency. However, traditional approaches of using parallel capacitance with a load may fail to successfully drive an OLED. That is because the ESR of the additional parallel capacitor may not optimized to accommodate an OLED. Indeed, higher ESR capacitors are frequently preferred by design engineers for their low frequency zero in the feedback compensation. As to ceramic capacitors (which have a low ESR), they are more fragile (e.g. crack more easily) and may not provide the high CV value (where C is capacitance and V is voltage) which is important in many traditional applications.

Figure 6:
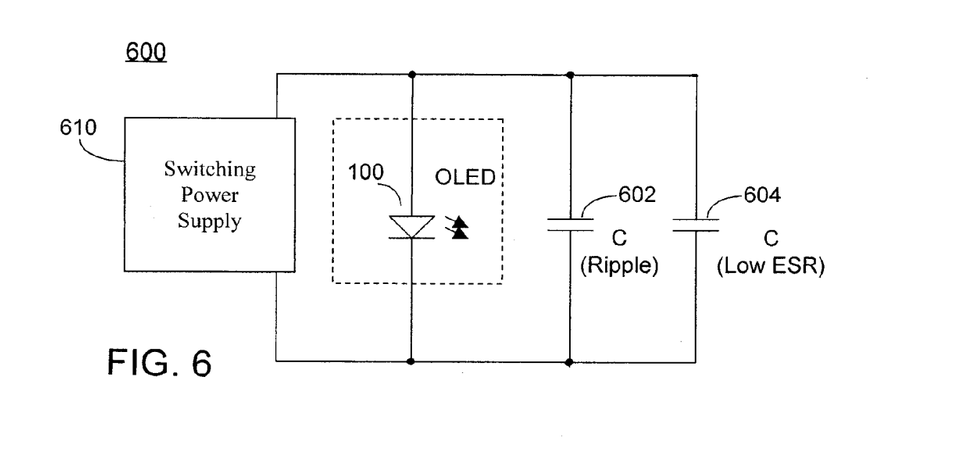
FIG. 6 is a simplified circuit diagram of an OLED with a parallel capacitor with high ESR and in parallel with a capacitor with low ESR.

However, even if capacitance with relatively high ESR (i.e., non-ceramic capacitor(s) 602 as illustrated in FIG. 6) is used for ripple control or the like, the non-ceramic capacitors 602 can still be made compatible in the context of driving an OLED 100 if an additional capacitor with low ESR 604 is introduced in parallel with the other high ESR capacitors. That is because the effective ESR of the entire load including the OLED 100, parallel capacitor(s) with high ESR 602, and the parallel capacitor with low ESR 604, is now dominated by the lower ESR value of the low ESR capacitor 604.

The parasitic impedance of the OLED, namely ESR 550 and capacitance 560 of FIG. 5, may affect the stability of the feedback loop of converter 500. In particular, the parasitic capacitance 560 provides an additional pair of poles and the parasitic resistance 550 provides a zero to the feedback loop of the power supply. Depending on the value of the OLED_C 560 and OLED_ESR 550, a compensation network may be used to stabilize the poles and zeros.

Figure 7:
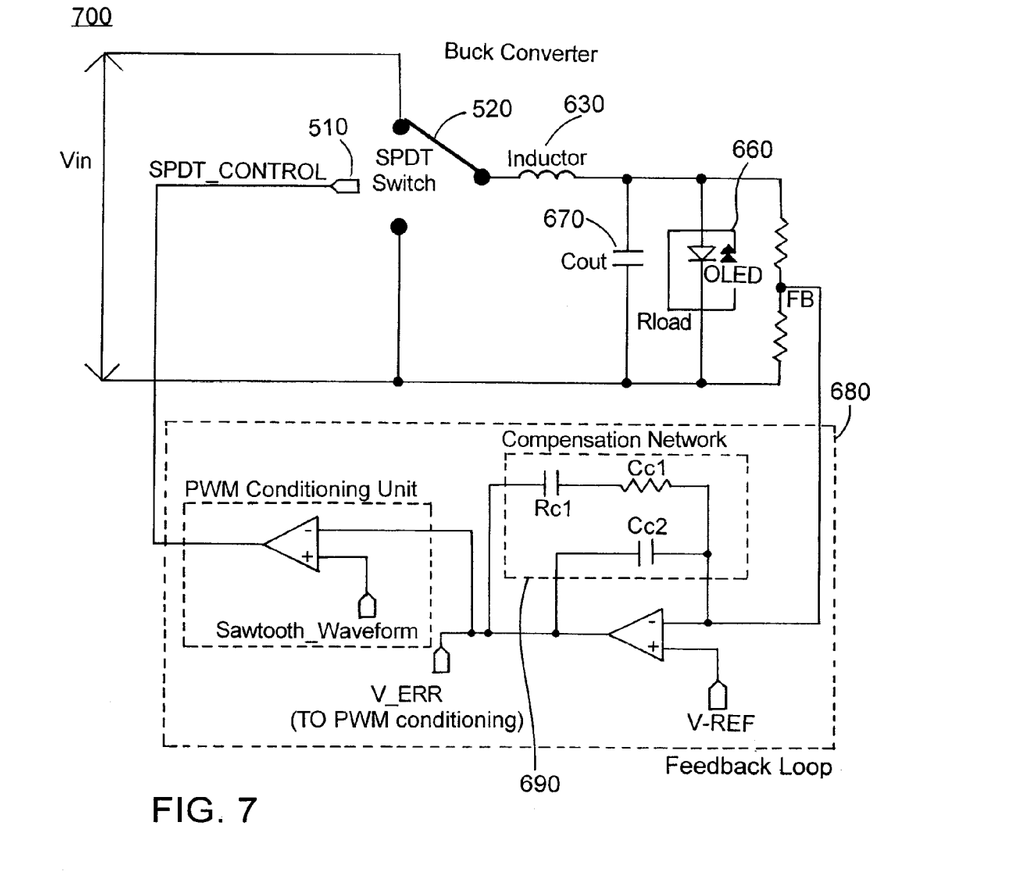
FIG. 7 is a buck converter with an OLED load and parallel capacitor, including feedback compensation.

FIG. 7 illustrates a buck converter with a feedback loop which is compensated for stability. Switch mode power supplies typically use at least one feedback loop 680 to sense the output voltage and/or current. The input 510 is adjusted accordingly to maintain a regulated output. For example, the duty cycle may be decreased if the output voltage is too high, or increased if the output voltage is too low. Further, the feedback loop 680 includes a compensation network 690. The duty cycle control can be fixed frequency (variable duty cycle), fixed ON Time (variable frequency), fixed OFF Time, or Hysteretic. FIG. 7 illustrates a voltage mode control, which includes a single control loop 680. In another example, average or peak current mode feedback control may be used, wherein the feedback includes two loops.

A power supply circuit, for supplying power to a LED, such as the OLED 100 in illustrated in FIG. 1a, can be a simple battery or can include a circuit that supplies power from a source at a controlled level of voltage and/or current. For lighting applications or the like that derive power from AC mains, circuitry would typically include one or more rectifiers to convert AC to pulsating DC and a regulator to process the pulsating DC current to produce a relatively constant DC current at a level appropriate to powering the applicable load.

Although linear regulators are known, most systems today use switching regulators to provide regulated direct current (DC) power. A switching regulator uses an energy storage circuit, typically formed by a capacitance, an inductance (e.g. inductor or transformer) or a combination thereof, together with one or more switches to effectively transfer electrical energy from the source to a regulated output. Examples of switching regulators include voltage-up (boost) converters and voltage-down (buck) converters as voltage inverters. The examples herein are based on switching regulators, although one skilled in the art will readily realize that a linear regulator or even a simple battery could be used as the power source. For completeness, several examples of converters are discussed that may be used in regulators for supplying power to LED or OLED type devices, although other elements of the regulator and/or the overall supply circuitry such as the rectifier(s) are omitted for simplicity.

Figure 2A:
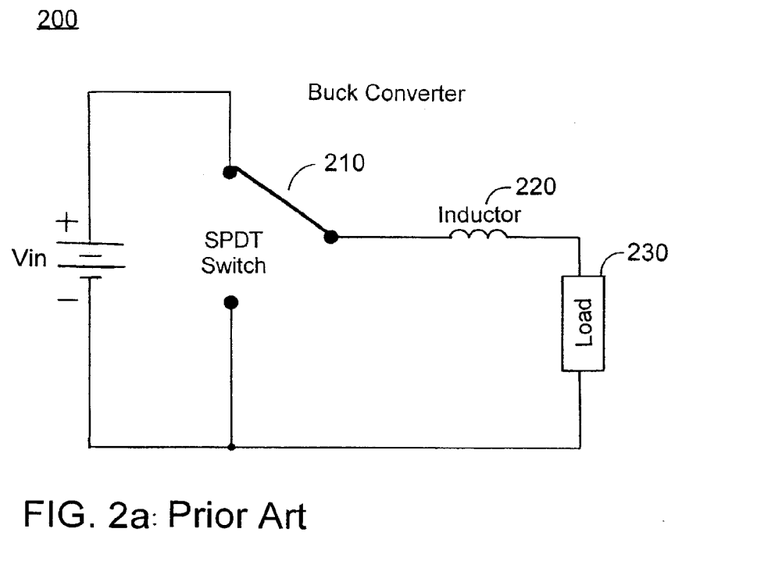
FIG. 2a is a buck converter used as an example to demonstrate how design considerations can affect the Turn-ON/OFF times for an OLED.
Figure 2B:
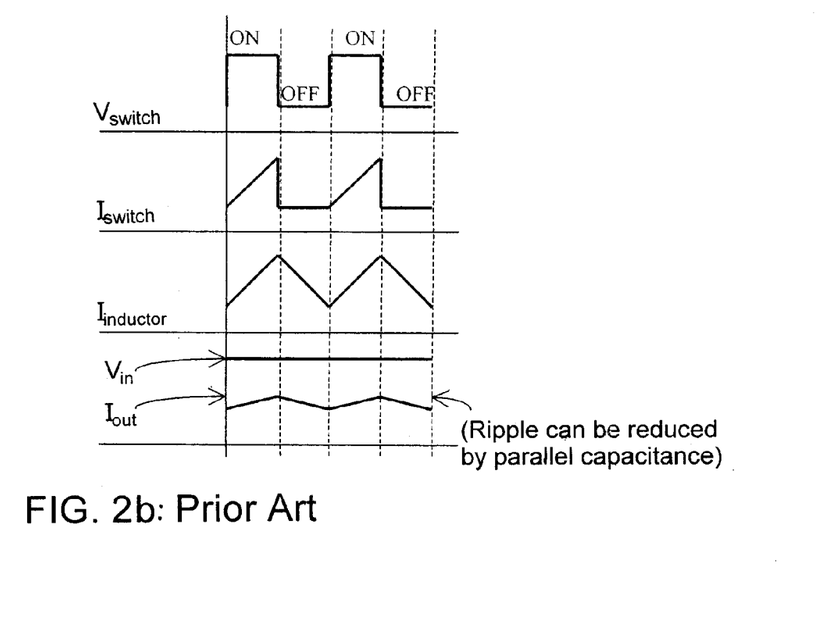
FIG. 2b illustrates timing diagrams of a typical buck regulator.

FIG. 2a illustrates a simple buck converter with a load 230, A buck converter is a step-down switch-mode DC to DC converter. It is one of the most widely used topologies in power electronics. Indeed, it is commonly found in LED driver applications. In one example, the single pole double throw (SPDT) switch 210 may comprise a pair of MOSFETs. FIG. 2b illustrates timing diagrams of a typical buck regulator. When the switch 210 closes (i.e., connected to Vin and therefore ON), the current through the inductor 220 rises linearly. When the switch opens (e.g., connected to ground and therefore OFF), the current through the inductor 220 goes down linearly. That is because there is a path from ground, through the switch 210, through the inductor 220, to the load 230—gradually discharging the stored energy in the inductor 220. The relationship between voltage and current in an inductor is provided in Eq. 1a below.

$$v(t) = L \frac{di(t)}{dt} \quad \text{(Eq. 1a)}$$

Thus, when the switch 210 is ON, Vin provides energy to the load as well as the inductor, wherein the inductor linearly charges over time. However, during the interval when the switch is OFF, the inductor current goes down linearly, continuing to provide its stored energy to the load 230. In this regard, the voltage at the load is governed by the time the switch is ON versus OFF, known as the duty cycle. Eq. 1b below summarizes this relationship.

$$V_{LOAD} = V_{IN} \frac{T_{ON}}{T_{ON} + T_{OFF}} = V_{IN} \times F_{switching} \quad \text{(Eq. 1b)}$$

It will be understood that the buck converter in the foregoing discussion is used for example purposes. In this regard, it will be appreciated by those of skill in the art that the examples shown can be extended to the design of other power supplies and drivers for OLEDs. For example, switching topologies such as boost, boost-buck (CUK), and buck-boost are supported as well. Still further, the teachings herein also apply to linear regulators or a simple DC voltage sources with a switch.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A light emitting apparatus, comprising:
   an organic light emitting diode (OLED);
   a power supply configured to drive the OLED without pre-charge, the OLED being connected across an output of the power supply;
   a first capacitor connected in parallel with the OLED across the output of the power supply,
   wherein an equivalent series resistance (ESR) of the first parallel capacitor is less than or equal to 10% of an ESR of the OLED at turn-on of the OLED; and
   a second capacitor connected in parallel with the OLED,
   wherein the first parallel capacitor has an ESR substantially lower than the second parallel capacitor, wherein the first parallel capacitor is a ceramic capacitor.

2. The light emitting apparatus of claim 1, wherein the power supply comprises a switch-mode driver.

3. The light emitting apparatus of claim 2, wherein the power supply further comprises a feedback circuit for stabilization.

4. The light emitting apparatus of claim 2, wherein the OLED is dimmable through pulse width modulation (PWM).

5. A light emitting apparatus, comprising
   an organic light emitting diode (OLED);
   a power supply configured to drive the OLED without pre-charge, the OLED being connected across an output of the power supply;
   a first capacitor connected in parallel with the OLED across the output of the power supply; and
   a second capacitor connected in parallel with the OLED, wherein:
   an equivalent series resistance (ESR) of the first parallel capacitor is substantially less than an ESR of the OLED at turn-on of the OLED,
   the first parallel capacitor has an ESR substantially lower than the second parallel capacitor, and
   turn-on delay of the OLED is substantially determined by the ESR of the first parallel capacitor, and not substantially determined by the ESR of the OLED, wherein the first parallel capacitor is a ceramic capacitor.

6. The light emitting apparatus of claim 5, wherein the ESR of the first parallel capacitor is less than or equal to 10% of an ESR of the OLED at turn-on of the OLED.

7. The light emitting apparatus of claim 5, wherein the ESR of the first parallel capacitor is such that the delay in turn-ON of the OLED is less than or equal to 0.1 seconds.

8. The light emitting apparatus of claim 5, wherein the ESR of the first parallel capacitor is such that the delay in turn-ON of the OLED is less than or equal to 1 μs.

9. The light emitting apparatus of claim 5, wherein the power supply comprises a switch-mode driver.

10. The light emitting apparatus of claim 9, wherein the power supply further comprises a feedback circuit for stabilization.

11. A method of driving an organic light emitting diode (OLED), the method comprising:
    applying power to the OLED without pre-charge; and
    reducing a resistance of the OLED by providing a first capacitor in parallel with the OLED with an equivalent series resistance (ESR) that is less than or equal to 10% of an ESR of the OLED at turn-on of the OLED, wherein:
    there is a second capacitor connected in parallel with the OLED, and
    the first parallel capacitor has an ESR substantially lower than the second parallel capacitor, wherein the first parallel capacitor is a ceramic capacitor.

12. The method of claim 11, further comprising dimming the OLED through pulse width modulation (PWM).

13. A method of driving an organic light emitting diode (OLED), the method comprising:
    applying power to the OLED without pre-charge; and
    reducing a resistance of the OLED by providing a first capacitor in parallel with the OLED with an equivalent series resistance (ESR) of the parallel capacitor is substantially less than an ESR of the OLED at turn-on of the OLED, wherein:
    there is a second capacitor connected in parallel with the OLED, and
    the first parallel capacitor has an ESR substantially lower than the second parallel capacitor, and
    turn-on delay of the OLED when power is applied to the OLED is determined substantially by the ESR of the first parallel capacitor, and not by the ESR of the OLED, wherein the first parallel capacitor is a ceramic capacitor.

14. The method of claim 13, wherein the ESR of the first parallel capacitor is less than or equal to 10% of an ESR of the OLED at turn-on of the OLED.

15. The method of claim 13, further comprising delaying turn-ON of the OLED by less than or equal to 0.1 seconds by the ESR of the first parallel capacitor.

16. The method of claim 13, further comprising delaying turn-ON of the OLED by less than or equal to 1 μs by the first parallel capacitor.

17. The method of claim 13, further comprising dimming the OLED through pulse width modulation (PWM).

* * * * *